(12) United States Patent
Chen et al.

(10) Patent No.: US 10,781,855 B2
(45) Date of Patent: Sep. 22, 2020

(54) SLIDE RAIL ASSEMBLY

(71) Applicants: KING SLIDE WORKS CO., LTD., Kaohsiung (TW); KING SLIDE TECNOLOGY CO., LTD., Kaohsiung (TW)

(72) Inventors: Ken-Ching Chen, Kaohsiung (TW); Shun-Ho Yang, Kaohsiung (TW); Chiang-Hsueh Fang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 108 days.

(21) Appl. No.: 15/637,190

(22) Filed: Jun. 29, 2017

(65) Prior Publication Data

US 2018/0119736 A1 May 3, 2018

(30) Foreign Application Priority Data

Nov. 1, 2016 (TW) .............................. 105135628 A

(51) Int. Cl.
*F16C 29/06* (2006.01)
*A47B 88/473* (2017.01)
(Continued)

(52) U.S. Cl.
CPC .......... *F16C 29/063* (2013.01); *A47B 88/473* (2017.01); *F16C 29/04* (2013.01);
(Continued)

(58) Field of Classification Search
CPC ..... A47B 88/473; A47B 88/453; A47B 88/46; A47B 88/477; A47B 2210/0091;
(Continued)

(56) References Cited

U.S. PATENT DOCUMENTS 3,904,254 A * 9/1975 Hagen ..................... F16C 29/04
312/334.47
4,537,450 A 8/1985 Baxter
(Continued)

FOREIGN PATENT DOCUMENTS

DE 8114891 U1 8/1981
JP 3063321 U 10/1999
(Continued)

OTHER PUBLICATIONS

Search Report for European Application Serial No. 17179510, dated Aug. 18, 2017.
Article 94(3) Communication for European Application Serial No. 17179510, dated Jul. 3, 2018.
Notice of Reason for Refusal for Japanese Application Serial No. 20170141660 (with machine translation), dated Sep. 11, 2018.

*Primary Examiner* — Daniel J Troy
*Assistant Examiner* — Ryan A Doyle
(74) *Attorney, Agent, or Firm* — Rosenberg, Klein & Lee

(57) ABSTRACT

A slide rail assembly includes first and second rails, a ball bearing assembly, and a damping device. The first rail has front and rear ends and a middle portion therebetween. The second rail is displaceable with respect to the first rail. The ball bearing assembly is movably mounted between the front and rear ends of the first rail and includes a ball retainer with a plurality of balls and a stopping feature. The damping device is mounted on the middle portion of the first rail to provide a damping force corresponding to the stopping feature of the ball retainer. The ball retainer can be displaced by the second rail such that the stopping feature of the ball retainer contacts the damping device.

15 Claims, 6 Drawing Sheets

(51) Int. Cl.
*F16C 29/04* (2006.01)
*A47B 88/487* (2017.01)
*A47B 88/493* (2017.01)
*A47B 88/40* (2017.01)
*F16C 29/10* (2006.01)
*F16C 29/08* (2006.01)

(52) U.S. Cl.
CPC ............ *F16C 29/084* (2013.01); *A47B 88/40* (2017.01); *A47B 88/487* (2017.01); *A47B 88/493* (2017.01); *A47B 2210/0035* (2013.01); *A47B 2210/0094* (2013.01); *A47B 2210/0097* (2013.01); *F16C 29/10* (2013.01)

(58) Field of Classification Search
CPC .......... A47B 2210/0097; A47B 88/493; A47B 2210/0035; F16C 29/063; F16C 29/084; F16C 29/04; F16C 29/10
See application file for complete search history.

(56) References Cited

U.S. PATENT DOCUMENTS

| | | | |
|---|---|---|---|
| 5,181,781 A * | 1/1993 | Wojcik | F16C 19/10 |
| | | | 312/334.44 |
| 8,210,623 B2 | 7/2012 | Chen et al. | |
| 2004/0174101 A1* | 9/2004 | Lin | E05F 5/10 |
| | | | 312/333 |
| 2015/0043842 A1* | 2/2015 | Stijns | F16C 33/38 |
| | | | 384/18 |

FOREIGN PATENT DOCUMENTS

| | | |
|---|---|---|
| JP | 2005002633 A | 1/2005 |
| JP | 2015195960 A | 11/2015 |
| JP | 2016120223 A | 7/2016 |
| WO | 2013141709 A1 | 9/2013 |

* cited by examiner

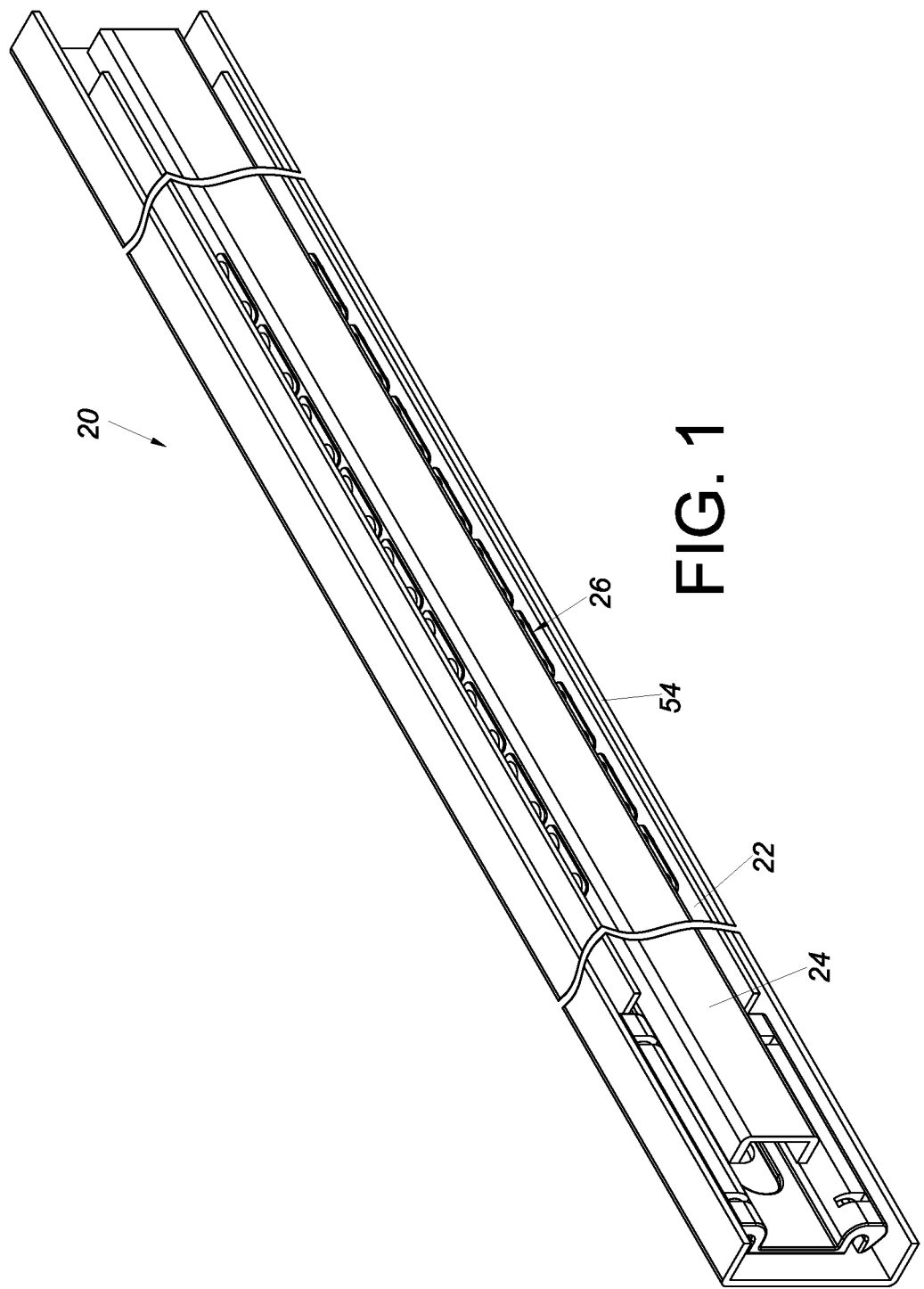

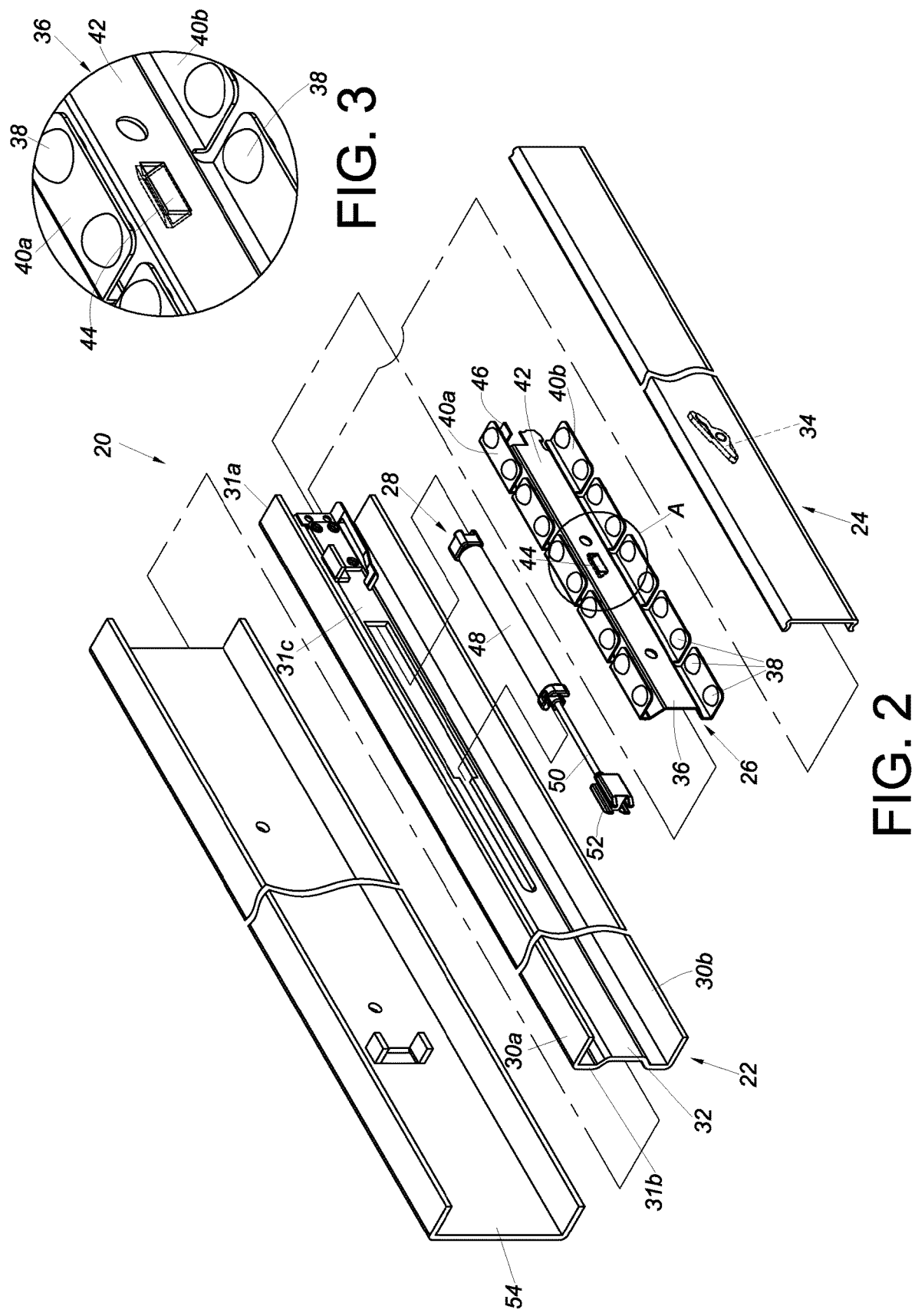

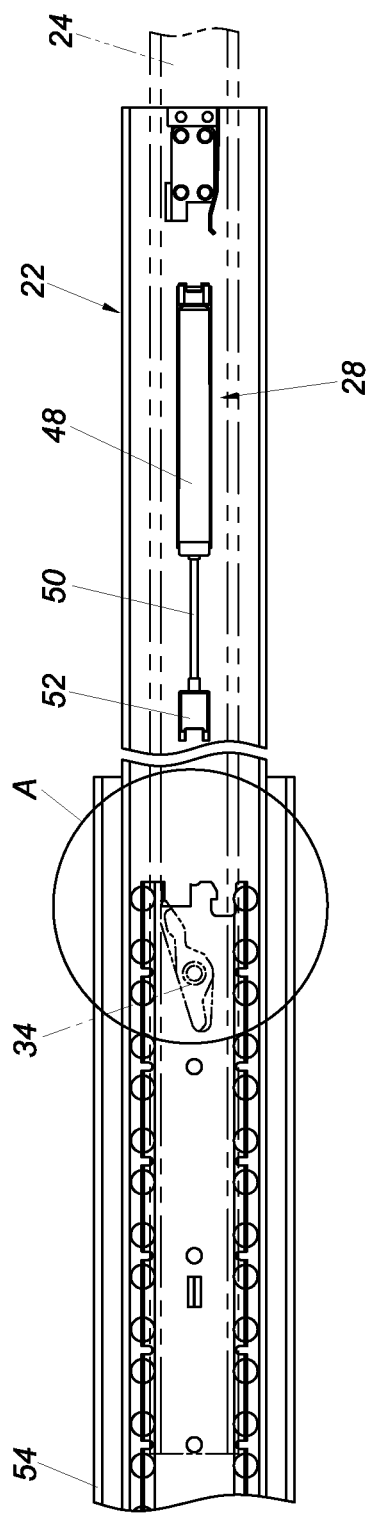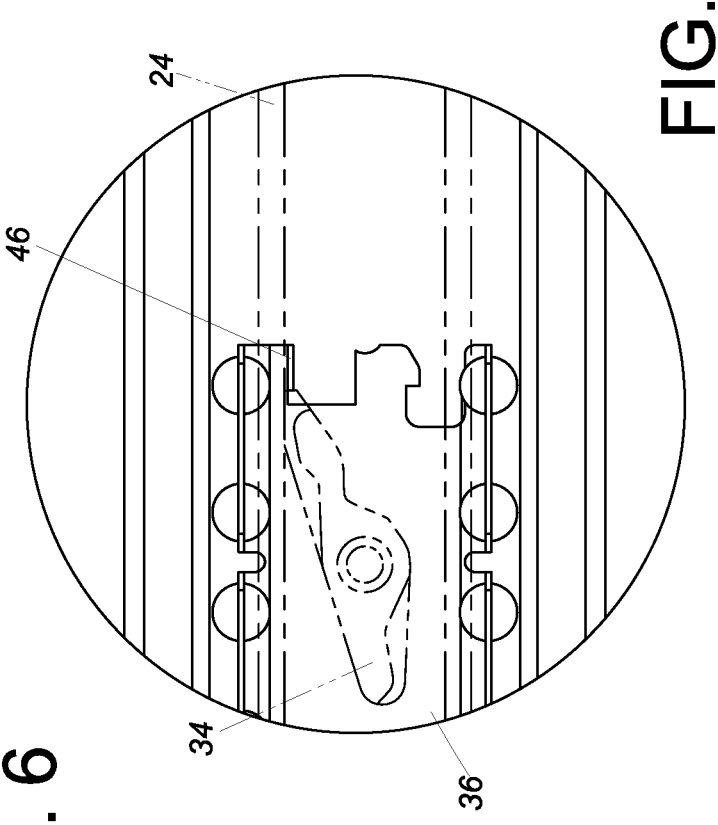

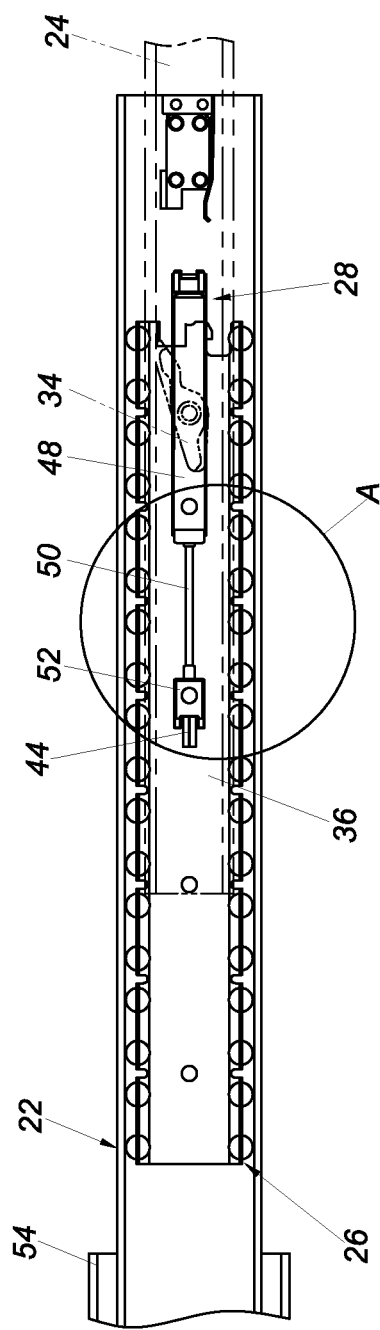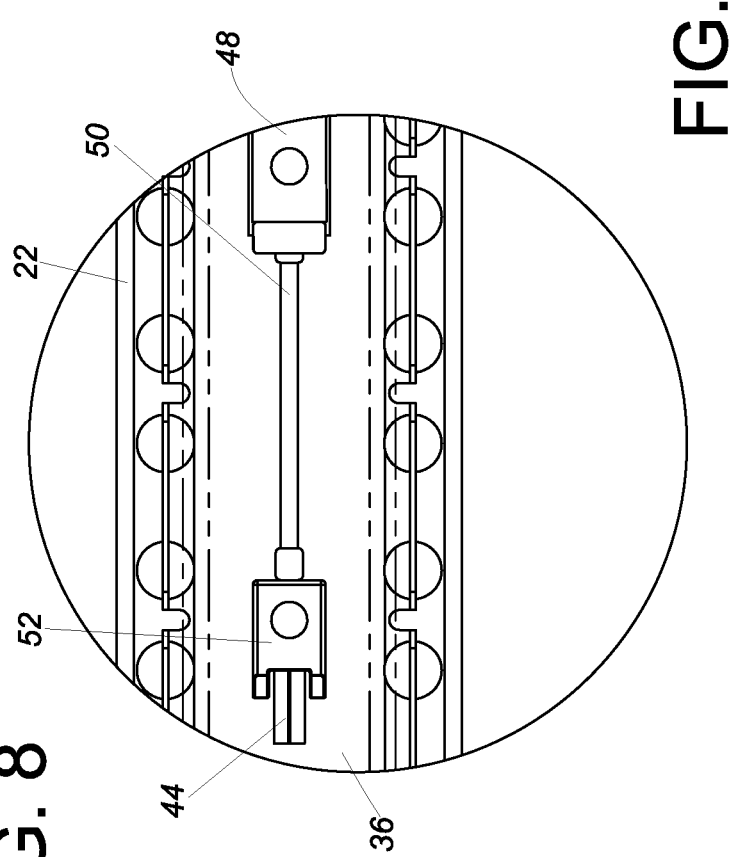
FIG. 8
FIG. 9

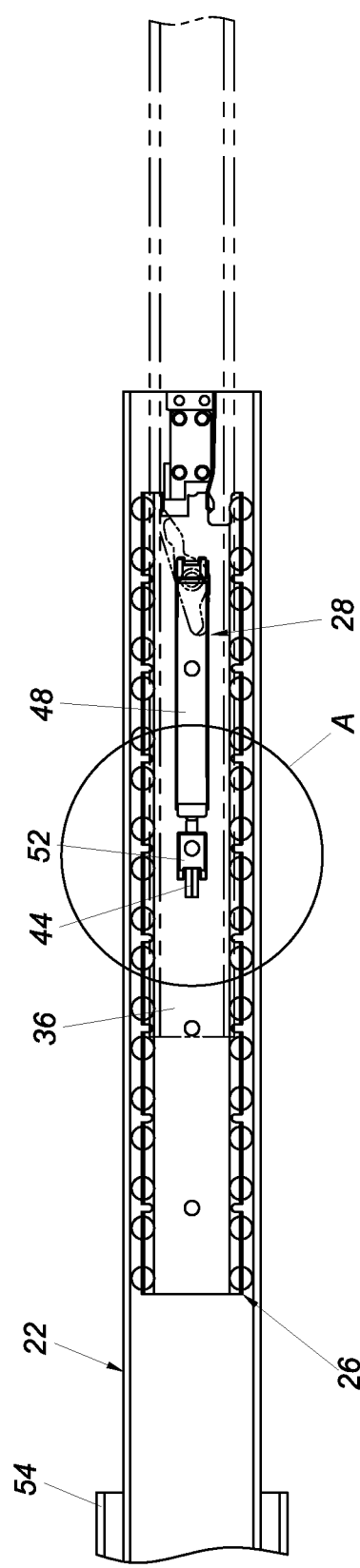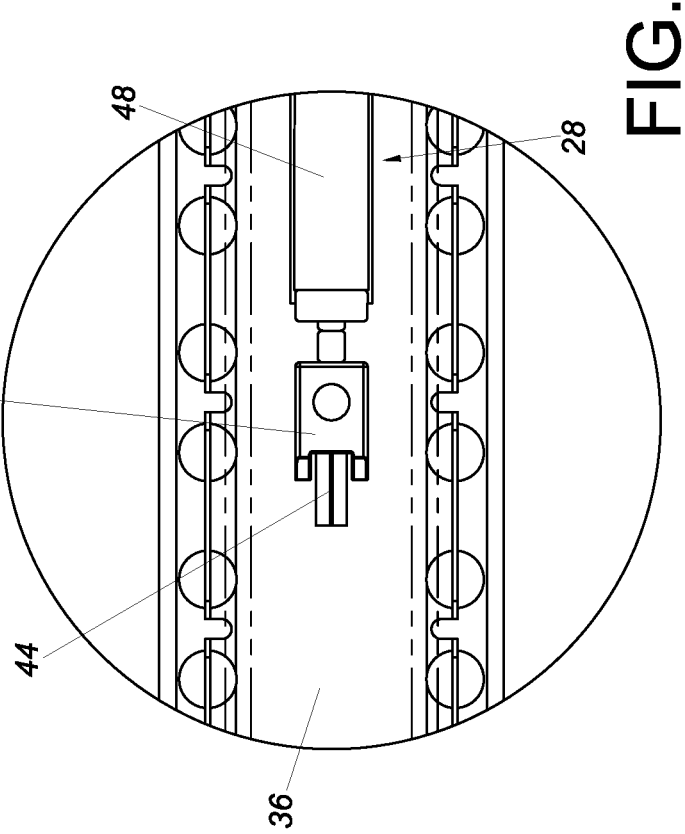

SLIDE RAIL ASSEMBLY

FIELD OF THE INVENTION

The present invention relates to a slide rail assembly and more particularly to one configured to produce a damping effect when a slide rail is extended.

BACKGROUND OF THE INVENTION

In U.S. Pat. No. 8,919,897 B2, Chen et al. disclose a slide rail assembly with a damping mechanism for damping the extending process of a slide rail. More specifically, the force by which the slide rail is pulled open is reduced by frictional contact with the damping mechanism when all but an end section of the slide rail enters an extended state. The disclosure of the '897 B2 patent is incorporated herein by reference.

As slide rail assemblies may be used to carry objects of different weights, e.g., the chassis of different electronic servers, an entirely friction-based design for decelerating a slide rail that is extended to the fullest extent except for an end section thereof is unlikely to meet the changing needs of the market, particularly the need for a slide rail assembly to carry different loads.

In addition, although the damping mechanism in the '897 B2 patent can provide friction-based deceleration, the deceleration effect is subject to a limitation on the number of times of friction application. In consideration of the above, the present invention was developed.

SUMMARY OF THE INVENTION

The present invention produces a damping effect on a slide rail when the slide rail is extended to a predetermined position.

According to one aspect of the present invention, a slide rail assembly includes a first rail, a second rail, and a damping device. The second rail can be displaced with respect to the first rail. The damping device is mounted on the first rail and produces a damping effect on the second rail when the second rail is displaced in a predetermined direction, and thereby extended, with respect to the first rail from a retracted position and reached a predetermined position.

Preferably, the slide rail assembly further includes a ball bearing assembly. The ball bearing assembly is mounted between the first rail and the second rail, or between a front end and a rear end of the first rail, wherein the ball bearing assembly includes a ball retainer and a plurality of balls mounted in the ball retainer. In some embodiments, the balls are in contact with the second rail. Moreover, the ball retainer includes a stopping feature, and when the stopping feature of the ball retainer comes into contact with the damping device, the damping effect is produced.

Preferably, the damping device is mounted on a middle portion of the first rail, wherein the middle portion rail is located between the front end and the rear end of the first rail.

Preferably, the first rail includes an upper wall, a lower wall, and a sidewall connected between the upper wall and the lower wall. The ball retainer includes an upper retainer portion, a lower retainer portion, and a side portion connected between the upper retainer portion and the lower retainer portion. The upper retainer portion is adjacent to the upper wall of the first rail, the lower retainer portion is adjacent to the lower wall of the first rail, the side portion is adjacent to the sidewall of the first rail, and the balls are mounted in the upper retainer portion and the lower retainer portion of the ball retainer.

Preferably, the slide rail assembly further includes a stopper provided on the second rail, and the ball retainer further includes a projection adjacent to the front end of the side portion, wherein the stopper corresponds in position to the projection of the ball retainer.

Preferably, the stopping feature is located on the side portion of the ball retainer.

Preferably, the damping device includes a cylinder and a damping rod, wherein the damping rod normally extends out of the cylinder to provide a damping force. When the damping rod is pushed by an external force and hence slowly retracted into the cylinder, the stopping feature of the ball retainer responds to the damping force to produce the damping effect.

Preferably, the slide rail assembly further including a fitting mounted on the damping rod, and the fitting corresponds to the stopping feature of the ball retainer.

Preferably, the slide rail assembly further includes a third rail with respect to which the first rail can be displaced.

BRIEF DESCRIPTION OF THE DRAWINGS

FIG. 1 is an assembled perspective view of the slide rail assembly according to an embodiment of the present invention;

FIG. 2 is an exploded perspective view of the slide rail assembly according to an embodiment of the present invention;

FIG. 3 is an enlarged view of the area A in FIG. 2;

FIG. 6 shows that the second rail in FIG. 5 is displaced with respect to the first rail to a position where the stopper of the second rail is pressed against the projection of the ball retainer;

FIG. 7 is an enlarged view of the area A in FIG. 6;

FIG. 8 shows initial collision between the stopping feature of the ball retainer in FIG. 6 and the damping device;

FIG. 9 is an enlarged view of the area A in FIG. 8;

FIG. 10 shows that after the stopping feature in FIG. 9 pushes the damping device further, the damping rod is completely retracted in the cylinder; and FIG. 11 is an enlarged view of the area A in FIG. 10.

DETAILED DESCRIPTION OF THE INVENTION

Figure 4:
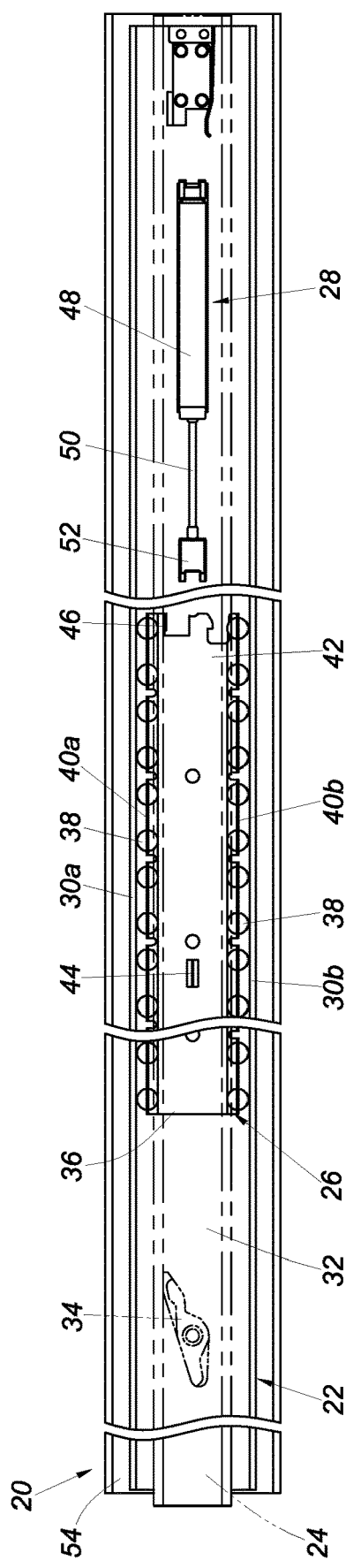
FIG. 4 shows the slide rail assembly according to an embodiment of the present invention in a retracted position.

Referring to FIG. 1 to FIG. 4, the slide rail assembly 20 in an embodiment of the present invention includes a first rail 22, a second rail 24, a ball bearing assembly 26, and a damping device 28.

The first rail 22 includes an upper wall 30a, a lower wall 30b, and a sidewall 32 connected between the upper wall 30a and the lower wall 30b. More specifically, the first rail 22 has a front end 31a, a rear end 31b, and a middle portion 31c between the front end 31a and the rear end 31b.

The second rail 24 can be displaced with respect to the first rail 22 and is provided with a stopper 34. The stopper 34 may be a component attached to or integrally formed with the second rail 24; the present invention has no limitation in this regard.

The ball bearing assembly 26 is movably mounted between the first rail 22 and the second rail 24, or the ball bearing assembly 26 is movably mounted between the front end 31a and the rear end 31b of the first rail 22. The ball bearing assembly 26 includes a ball retainer 36 and a plurality of balls 38. The ball retainer 36 includes an upper retainer portion 40a, a lower retainer portion 40b, and a side portion 42 connected between the upper retainer portion 40a and the lower retainer portion 40b. The upper retainer portion 40a is adjacent to the upper wall 30a of the first rail 22. The lower retainer portion 40b is adjacent to the lower wall 30b of the first rail 22. The side portion 42 is adjacent to the sidewall 32 of the first rail 22. The balls 38 are mounted in the upper retainer portion 40a and the lower retainer portion 40b of the ball retainer 36 and are in contact with the second rail 24. In addition, the ball retainer 36 includes a stopping feature 44. The stopping feature 44 is preferably located on the side portion 42 of the ball retainer 36. In a preferred embodiment, the ball retainer 36 further includes a projection 46 adjacent to the front end of the side portion 42, and the projection 46 has a corresponding relationship with the stopper 34. For example, the stopper 34 corresponds in position to the projection 46.

The damping device 28 is mounted on the first rail 22 and includes a cylinder 48 and a damping rod 50. Normally, the damping rod 50 extends out of the cylinder 48 to provide a damping force. When pushed by an external force, however, the damping rod 50 is slowly retracted into the cylinder 48 to produce a damping effect. In a preferred embodiment, the damping device 28 is further mounted with a fitting 52 corresponding in position to the stopping feature 44 of the ball retainer 36.

In a preferred embodiment, the slide rail assembly 20 further includes a third rail 54, and the first rail 22 can be displaced with respect to the third rail 54. FIG. 4 shows the second rail 24 at a retracted position with respect to the first rail 22.

Figure 5:
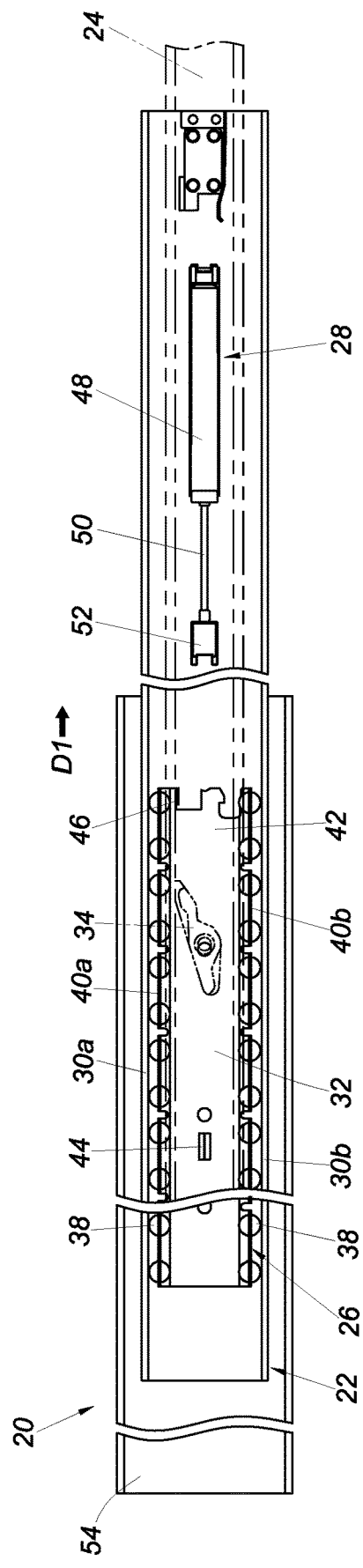
FIG. 5 shows initial displacement, or extension, of the second rail in FIG. 4 with respect to the first rail.

Referring to FIG. 5 to FIG. 7, when the second rail 24 is displaced in a direction D1, or extended, with respect to the first rail 22 from the retracted position, the ball retainer 36 is driven to displace by the second rail 24 through rolling contact between the balls 38 and the second rail 24. Once the stopper 34 of the second rail 24 is pressed against the projection 46 of the ball retainer 36, the ball retainer 36 can be displaced directly by the second rail 24.

Referring to FIG. 8 to FIG. 11, when the ball retainer 36 directly displaced by the second rail 24 reaches a predetermined position, the stopping feature 44 of the ball retainer 36 collides with the fitting 52 on the damping rod 50 of the damping device 28. The colliding force drives the damping rod 50 of the damping device 28 slowly into the cylinder 48 to produce the intended damping effect. In other words, the damping effect is produced by the stopping feature 44 of the ball retainer 36 responsive to the damping force of the damping rod 50. Consequently, displacement, or extension, of the second rail 24 with respect to the first rail 22 is decelerated.

While the present invention has been disclosed through the preferred embodiments described above, it should be understood that the foregoing embodiments are not intended to be restrictive of the scope of the invention. The scope of patent protection sought by the applicant is defined by the appended claims.

What is claimed is:

1. A slide rail assembly, comprising:
a first rail including an upper wall, a lower wall, and a sidewall connected between the upper wall and the lower wall;
a second rail displaceable with respect to the first rail;
a ball bearing assembly movably mounted between the first rail and the second rail, wherein the ball bearing assembly includes a ball retainer and a plurality of balls, the ball retainer includes an upper retainer portion, a lower retainer portion, and a side portion connected between the upper retainer portion and the lower retainer portion, the upper retainer portion is adjacent to the upper wall of the first rail, the lower retainer portion is adjacent to the lower wall of the first rail, the side portion is adjacent to the sidewall of the first rail, the balls are mounted in the upper retainer portion and the lower retainer portion of the ball retainer, and the ball retainer further includes a stopping feature intermediately disposed on the side portion; and
a damping device corresponding to the stopping feature of the ball retainer;
wherein when the second rail is displaced, and thereby extended, with respect to the first rail, the ball retainer is driven to displace by the second rail relative to the damping device, and when the stopping feature of the ball retainer comes into contact with the damping device, a damping effect is produced; and
wherein the second rail remains spaced from the damping device.

2. The slide rail assembly of claim 1, further comprising a stopper provided on the second rail, wherein the ball retainer includes a projection adjacent to a front end of the side portion, and the stopper corresponds in position to the projection of the ball retainer.

3. The slide rail assembly of claim 1, wherein the damping device is mounted on the first rail and includes a cylinder and a damping rod, the damping rod normally extends out of the cylinder to provide a damping force, and when the damping rod is pushed by an external force and hence slowly retracted into the cylinder, the stopping feature of the ball retainer produces the damping effect responsive to the damping force.

4. The slide rail assembly of claim 3, further comprising a fitting mounted on the damping rod, wherein the fitting corresponds to the stopping feature of the ball retainer.

5. The slide rail assembly of claim 1, further comprising a third rail with respect to which the first rail is displaceable.

6. A slide rail assembly, comprising:
a first rail including a front end, a rear end, and a middle portion between the front end and the rear end;
a second rail displaceable with respect to the first rail;
a ball bearing assembly movably mounted on the first rail to be displaceable between the front end and the rear end of the first rail, wherein the ball bearing assembly includes a ball retainer and a plurality of balls, and the ball retainer includes a stopping feature; and
a damping device mounted on the middle portion of the first rail and configured to provide a damping force corresponding to the stopping feature of the ball retainer when the ball retainer is displaced relative to the damping device;
wherein the second rail remains spaced from the damping device.

7. The slide rail assembly of claim 6, wherein:
the first rail includes an upper wall, a lower wall, and a sidewall connected between the upper wall and the lower wall;
the ball retainer includes an upper retainer portion, a lower retainer portion, and a side portion connected between the upper retainer portion and the lower retainer portion;
the upper retainer portion is adjacent to the upper wall of the first rail;
the lower retainer portion is adjacent to the lower wall of the first rail;
the side portion is adjacent to the sidewall of the first rail; and
the balls are mounted in the upper retainer portion and the lower retainer portion of the ball retainer.

8. The slide rail assembly of claim 7, further comprising a stopper provided on the second rail, wherein the ball retainer includes a projection adjacent to a front end of the side portion, and the stopper corresponds in position to the projection of the ball retainer.

9. The slide rail assembly of claim 7, wherein the stopping feature is located on the side portion of the ball retainer.

10. The slide rail assembly of claim 6, wherein the damping device includes a cylinder and a damping rod, the damping rod normally extends out of the cylinder to provide the damping force, and when the damping rod is pushed by an external force and hence slowly retracted into the cylinder, the stopping feature of the ball retainer produces a damping effect responsive to the damping force.

11. The slide rail assembly of claim 10, further comprising a fitting mounted on the damping rod, wherein the fitting corresponds to the stopping feature of the ball retainer.

12. The slide rail assembly of claim 6, further comprising a third rail with respect to which the first rail is displaceable.

13. A slide rail assembly, comprising:
a first rail including a front portion, a rear portion, and a middle portion between the front portion and the rear portion;
a second rail displaceable with respect to the first rail;
a ball bearing assembly movably mounted on the first rail to be displaceable between the front portion and the rear portion of the first rail; and
a damping device fixedly mounted on the middle portion of the first rail;
wherein when the second rail reaches a predetermined position after being displaced in a predetermined direction, and thereby extended, with respect to the first rail and the damping device from a retracted position, the ball bearing assembly comes into contact with the damping device and the damping device thereby produces a damping effect on the second rail; and
wherein the second rail remains spaced from the damping device.

14. The slide rail assembly of claim 13, wherein:
the ball bearing assembly is movably mounted between the first rail and the second rail;
the ball bearing assembly includes a ball retainer and a plurality of balls mounted in the ball retainer;
the balls are in contact with the second rail;
the ball retainer is driven to displace relative to the damping device by the second rail while the second rail is being displaced in the predetermined direction, and thereby extended, with respect to the first rail; and
once the second rail reaches the predetermined position, the damping effect is produced by the ball retainer coming into contact with the damping device.

15. The slide rail assembly of claim 14, wherein the ball retainer includes a stopping feature; the damping device includes a cylinder and a damping rod; the damping rod corresponds to the stopping feature of the ball retainer and normally extends out of the cylinder to provide a damping force; and when the damping rod is pushed by an external force and hence slowly retracted into the cylinder, the stopping feature of the ball retainer produces the damping effect responsive to the damping force.

* * * * *